US012356102B2

(12) United States Patent
Takahashi et al.

(10) Patent No.: US 12,356,102 B2
(45) Date of Patent: Jul. 8, 2025

(54) PHOTOELECTRIC CONVERSION APPARATUS, PHOTOELECTRIC CONVERSION SYSTEM, AND PHOTOELECTRIC CONVERSION METHOD

(71) Applicant: CANON KABUSHIKI KAISHA, Tokyo (JP)

(72) Inventors: Keisuke Takahashi, Tokyo (JP); Hideo Kobayashi, Tokyo (JP); Atsushi Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 18/453,343

(22) Filed: Aug. 22, 2023

(65) Prior Publication Data

US 2024/0080591 A1    Mar. 7, 2024

(30) Foreign Application Priority Data

Sep. 2, 2022    (JP) .................. 2022-140206

(51) Int. Cl.
 *H04N 25/78* (2023.01)
 *H04N 25/616* (2023.01)
 *H04N 25/772* (2023.01)

(52) U.S. Cl.
 CPC .......... *H04N 25/78* (2023.01); *H04N 25/616* (2023.01); *H04N 25/772* (2023.01)

(58) Field of Classification Search
 None
 See application file for complete search history.

(56) References Cited

U.S. PATENT DOCUMENTS

| 7,990,440 B2 | 8/2011 | Kobayashi et al. |
| 8,710,558 B2 | 4/2014 | Inoue et al. |
| 8,884,391 B2 | 11/2014 | Fudaba et al. |
| 9,264,641 B2 | 2/2016 | Kobayashi |
| 9,294,699 B2 | 3/2016 | Muto et al. |

(Continued)

FOREIGN PATENT DOCUMENTS

| JP | 2011-044813 A | 3/2011 |
| JP | 2014-140152 A | 7/2014 |

(Continued)

OTHER PUBLICATIONS

U.S. Appl. No. 18/453,342, filed Aug. 22, 2023 (First Named Inventor: Takeshi Shimada).

(Continued)

*Primary Examiner* — Mark T Monk
(74) *Attorney, Agent, or Firm* — Venable LLP

(57) ABSTRACT

Photoelectric conversion apparatus includes pixel array having effective pixel, a readout circuit configured to read out signal of the pixel array, and signal processing unit configured to perform correlated double sampling process and correction process on signals read out from the effective pixel by the readout circuit. The readout circuit has function of reading out signal of the pixel array with first gain, and function of reading out signal of the pixel array with second gain. Correction value for the correction process is generated based on difference between signal read out from the pixel array with the first gain when noise level is output from the pixel array, and signal read out from the pixel array with the second gain when noise level is output from the pixel array.

14 Claims, 10 Drawing Sheets

(56) References Cited

U.S. PATENT DOCUMENTS

| | | |
|---|---|---|
| 9,305,954 B2 | 4/2016 | Kato et al. |
| 9,357,122 B2 | 5/2016 | Kususaki et al. |
| 9,407,847 B2 | 8/2016 | Maehashi et al. |
| 9,438,828 B2 | 9/2016 | Itano et al. |
| 9,509,931 B2 | 11/2016 | Kobayashi et al. |
| 9,602,752 B2 | 3/2017 | Kobayashi et al. |
| 10,015,430 B2 | 7/2018 | Kobayashi et al. |
| 10,567,747 B2 | 2/2020 | Hayashi et al. |
| 10,609,316 B2 | 3/2020 | Kobayashi |
| 11,070,755 B2 | 7/2021 | Takahashi |
| 11,268,851 B2 | 3/2022 | Kobayashi et al. |
| 11,425,325 B2 | 8/2022 | Kasugai et al. |
| 11,431,929 B2 | 8/2022 | Kobayashi et al. |
| 11,463,644 B2 | 10/2022 | Soda et al. |
| 11,470,275 B2 | 10/2022 | Kobayashi et al. |
| 11,496,704 B2 | 11/2022 | Sato et al. |
| 11,616,925 B2 | 3/2023 | Kobayashi et al. |
| 11,653,114 B2 | 5/2023 | Nakazawa et al. |
| 11,688,755 B2 | 6/2023 | Kobayashi |
| 11,736,813 B2 | 8/2023 | Kobayashi |
| 11,800,253 B2 | 10/2023 | Saito et al. |
| 2014/0104465 A1 | 4/2014 | Yamashita |
| 2017/0208268 A1 | 7/2017 | Shin |
| 2017/0257592 A1 | 9/2017 | Higuchi |
| 2020/0314360 A1 | 10/2020 | Sakai et al. |
| 2020/0336681 A1 | 10/2020 | Kobuse et al. |
| 2020/0344431 A1 | 10/2020 | Kobuse et al. |
| 2021/0151485 A1* | 5/2021 | Ma .................. H04N 25/771 |
| 2022/0247964 A1 | 8/2022 | Kobayashi |
| 2022/0303484 A1 | 9/2022 | Kobayashi |
| 2022/0303485 A1 | 9/2022 | Kobayashi et al. |
| 2022/0303486 A1 | 9/2022 | Kobayashi |
| 2022/0321812 A1 | 10/2022 | Kobayashi et al. |
| 2022/0408036 A1 | 12/2022 | Ashida et al. |
| 2023/0041974 A1 | 2/2023 | Kobayashi |
| 2023/0070568 A1 | 3/2023 | Kobayashi et al. |
| 2023/0072715 A1 | 3/2023 | Kobayashi |
| 2023/0117988 A1 | 4/2023 | Kobayashi et al. |
| 2023/0154963 A1 | 5/2023 | Kobayashi et al. |
| 2023/0171514 A1 | 6/2023 | Kobayashi |
| 2023/0178580 A1 | 6/2023 | Yamazaki et al. |
| 2023/0179890 A1 | 6/2023 | Kobayashi et al. |
| 2023/0209217 A1 | 6/2023 | Shimada et al. |
| 2023/0216459 A1 | 7/2023 | Kobayashi et al. |
| 2023/0247332 A1 | 8/2023 | Kobayashi et al. |
| 2023/0282654 A1 | 9/2023 | Kobayashi |

FOREIGN PATENT DOCUMENTS

| | | |
|---|---|---|
| JP | 2017-158062 A | 9/2017 |
| JP | 2019-022096 A | 2/2019 |
| JP | 2020-061669 A | 4/2020 |
| JP | 2020-167544 A | 10/2020 |
| JP | 2020-182057 A | 11/2020 |
| JP | 2020-191543 A | 11/2020 |
| JP | 2021-106375 A | 7/2021 |
| WO | 2013/008598 A1 | 1/2013 |
| WO | 2016/098404 A1 | 6/2016 |

OTHER PUBLICATIONS

U.S. Appl. No. 18/453,345, filed Aug. 22, 2023 (First Named Inventor: Keita Masuda).

* cited by examiner

PHOTOELECTRIC CONVERSION APPARATUS, PHOTOELECTRIC CONVERSION SYSTEM, AND PHOTOELECTRIC CONVERSION METHOD

BACKGROUND OF THE INVENTION

Field of the Invention

The present invention relates to a photoelectric conversion apparatus, a photoelectric conversion system, and a photoelectric conversion method.

Description of the Related Art

A photoelectric conversion apparatus is demanded to have a large number of pixels and a high frame rate. In order to satisfy the demand, one of challenges is to increase the readout speed of signals by the photoelectric conversion apparatus. In addition to increasing the readout speed, there is also a strong demand for improvement of the S/N ratio and expansion of the dynamic range. There is known a photoelectric conversion apparatus that performs analog-to-digital (A/D) conversion, using different A/D converter circuits, of a first pixel signal obtained by amplifying a pixel signal with a first gain and a second pixel signal obtained by amplifying the pixel signal with a second gain different from the first gain. The photoelectric conversion apparatus selectively outputs one of the VD-converted first pixel signal and the VD-converted second pixel signal in accordance with the level of the pixel signal. With this, it is possible to implement expansion of the dynamic range and improvement of the S/N ratio. Japanese Patent Laid-Open No. 2014-140152 discloses a technique of correcting the offset error and the gain error generated when selectively outputting the first pixel signal and the second pixel signal.

It is known that the S/N ratio is improved by a Correlated Double Sampling (CDS) process in which the optical signal level and noise level generated by photoelectric conversion are read out from a pixel, and a pixel signal corresponding to the difference between the optical signal level and the noise level is generated. However, if the gain used when reading out the optical signal level is different from the gain used when reading out the noise level, a noise component can remain in the pixel signal generated by the CDS process.

SUMMARY OF THE INVENTION

The present invention provides a technique advantageous in effectively removing a noise component from a pixel signal.

One of aspects of the present disclosure provides a photoelectric conversion apparatus comprising a pixel array including an effective pixel, a readout circuit configured to read out signals of the pixel array, and a signal processing unit configured to perform a correlated double sampling process and a correction process on signals read out from the effective pixel in the pixel array by the readout circuit, wherein the readout circuit has a function of reading out a signal of the pixel array with a first gain, and a function of reading out a signal of the pixel array with a second gain different from the first gain, and a correction value for the correction process is generated based on a difference between a signal read out from the pixel array with the first gain by the readout circuit in a state in which a noise level is output from the pixel array, and a signal read out from the pixel array with the second gain by the readout circuit in a state in which a noise level is output from the pixel array.

Further features of the present invention will become apparent from the following description of exemplary embodiments with reference to the attached drawings.

DESCRIPTION OF THE EMBODIMENTS

Figure 1:
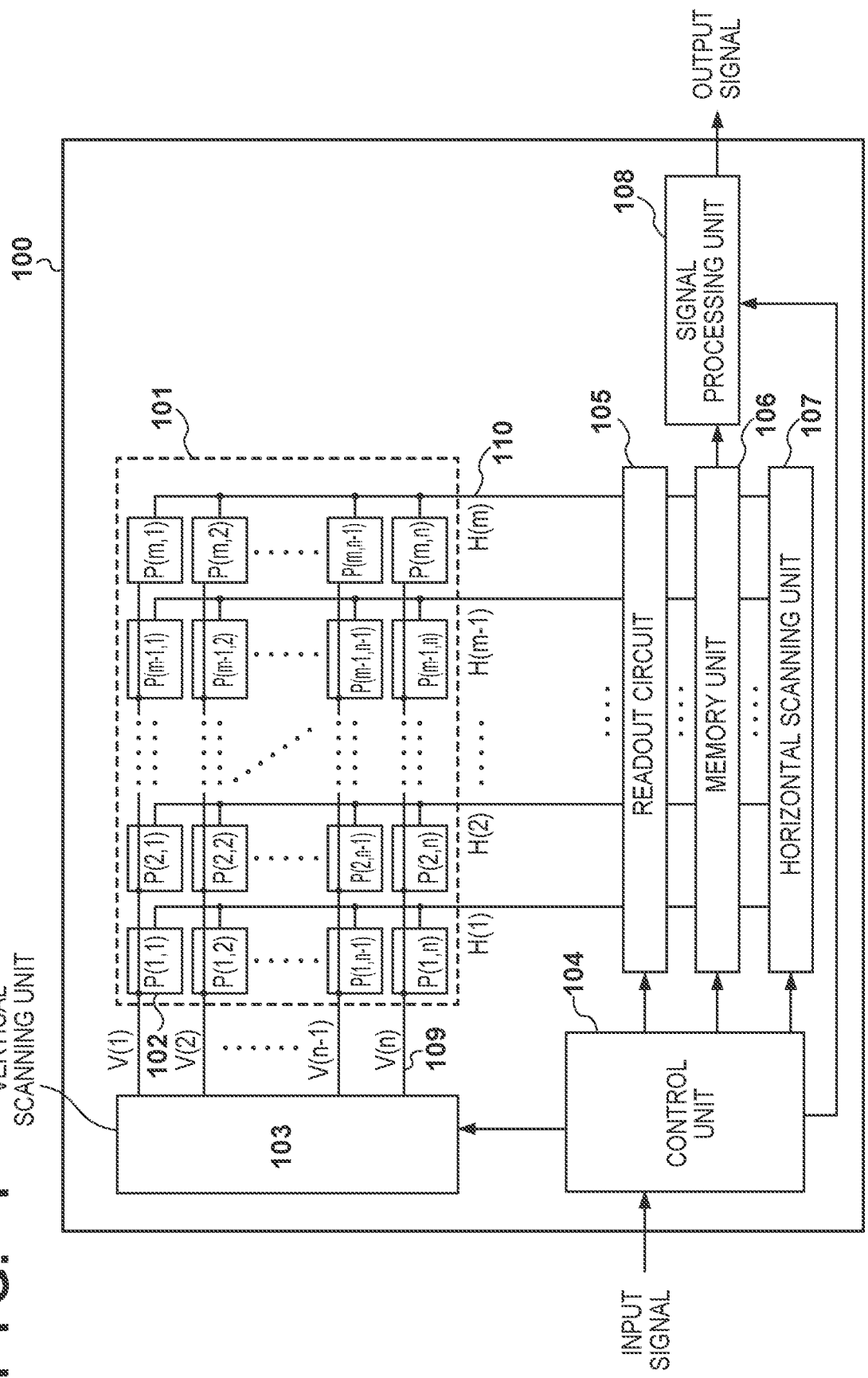
FIG. 1 is a view exemplarily showing the arrangement of a photoelectric conversion apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, with reference to FIGS. 1 to 10, a photoelectric conversion apparatus 100 according to the first embodiment of the present disclosure will be described below. The photoelectric conversion apparatus 100 may be composed of a chip formed by one semiconductor layer or semiconductor substrate, may be composed of a chip formed by a plurality of semiconductor layers or semiconductor substrates, or may be composed of a plurality of chips. The photoelectric conversion apparatus 100 can be formed as an image sensor or an apparatus including an image sensor.

FIG. 1 exemplarily shows the arrangement of the photoelectric conversion apparatus 100 according to the first embodiment. The photoelectric conversion apparatus 100 can include a pixel array 101 which includes a plurality of pixels 102 arranged so as to form a plurality of rows and a plurality of columns. In order to distinguish the pixel 102 from a reference pixel and an OB pixel to be described later, the pixel 102 can also be referred to as an effective pixel. The pixel array 101 can include a plurality of column signal lines 110. Each column of the pixel array 101 can be assigned with at least one column signal line 110. The photoelectric conversion apparatus 100 can also include a readout circuit 105 that reads out signals of the pixel array 101. The readout circuit 105 can have a function of reading out a signal of the pixel array 101 with a first gain, and a function of reading out a signal of the pixel array 101 with a second gain different from the first gain. The readout circuit 105 may be understood to have a function of reading out signals of the pixel array 101 with a plurality of gains different from each other. The readout circuit 105 can include a plurality of column circuits, and each column circuit can be configured to read out signals of the pixel array 101 through at least one column signal line 110.

The photoelectric conversion apparatus 100 can include a signal processing unit 108 that performs a correlated double sampling process (CDS process) and a correction process on signals read out from the pixel 102 (effective pixel) in the pixel array 101 by the readout circuit 105. The photoelectric conversion apparatus 100 can further include a vertical scanning unit 103, a control unit 104, and a horizontal scanning unit 107. In an arrangement example, the signal processing unit 108 can form a part of the photoelectric conversion apparatus 100. In another arrangement example, the signal processing unit 108 does not form a part of the photoelectric conversion apparatus 100. In this case, a system including the photoelectric conversion apparatus 100 and the signal processing unit 108 can be understood as a photoelectric conversion system. In such a photoelectric conversion system, the function of the signal processing unit 108 may be provided by a computer such as a personal computer, may be provided by a processor such as an ASIC, or may be implemented by another arrangement.

In the example shown in FIG. 1, the plurality of pixels 102 forming the pixel array 101 are arranged so as to form a matrix of m columns and n rows. The pixel unit 102 can also be written as a pixel P(i, j) to indicate its position. indicates the column where the pixel P(i, j) is arranged, and j indicates the row where the pixel P(i, j) is arranged. The vertical scanning unit 103 selects one row from n rows by n sets of row selection lines 109 (V(j) (j=1 to n)). Selecting a row means selecting m pixels 102 arranged in the row. The signals of the pixels 102 arranged in the selected row can be read out by the readout circuit 105 via the column signal lines 110 (H(i) (i=1 to m)). Readout by the readout circuit 105 includes a process of converting (that is, A/D-converting) a plurality of analog signals output from the pixels 102 to the column signal lines 110 into a plurality of digital signals in parallel, and the plurality of digital signals are temporarily stored in a memory unit 106. The readout circuit 105 may include an amplification circuit and the like. The amplification circuit can amplify the signal output from the pixel 102. The plurality of digital signals stored in the memory unit 106 can be then sequentially selected by the horizontal scanning unit 107 and supplied to the signal processing unit 108. The signal processing unit 108 processes the digital signals supplied as described above, and outputs signals obtained by the process. The control unit 104 can acquire setting information for setting the image capturing condition and the like in image capturing by the photoelectric conversion apparatus 100, and supply a control signal corresponding to the image capturing condition to each component included in the photoelectric conversion apparatus 100. The control unit 104 can be configured to control the vertical scanning unit 103, the readout circuit 105, the memory unit 106, the horizontal scanning unit 107, and the signal processing unit 108 based on the setting information.

Figure 2:
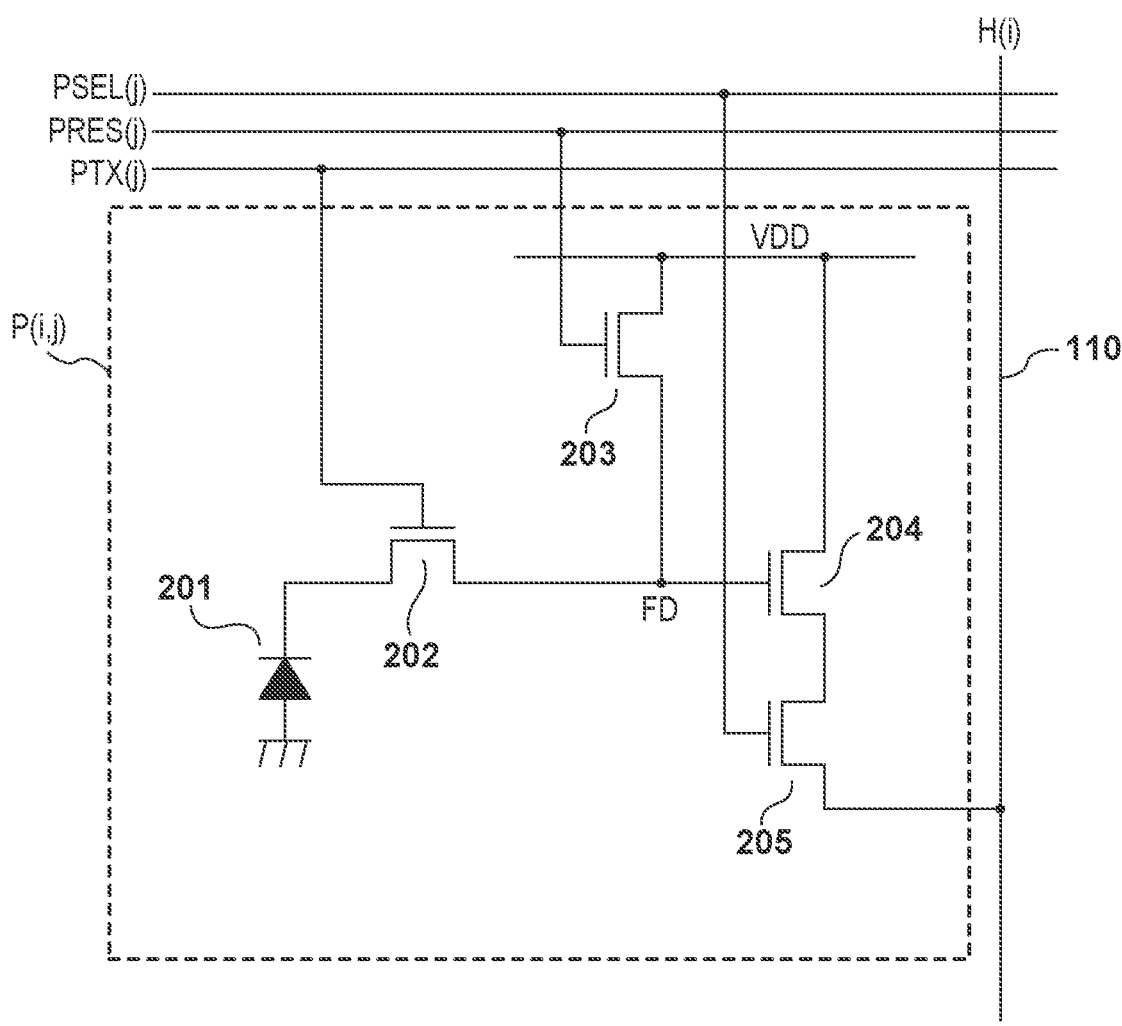
FIG. 2 is a view exemplarily showing the arrangement of a pixel.

FIG. 2 shows an arrangement example of the pixel 102(P(i, j)). The pixel 102 can include, for example, a photoelectric conversion element 2201, a transfer transistor 2202, a floating diffusion FD, a reset transistor 203, an amplification transistor 204, and a selection transistor 205. The photoelectric conversion element 201 performs photoelectric conversion, thereby generating electric charges corresponding to the incident light amount. The photoelectric conversion element 201 is, for example, a photodiode. The transfer transistor 202 transfers the electric charges generated by photoelectric conversion in the photoelectric conversion element 201 to the floating diffusion FD. The electric charges transferred to the floating diffusion FD are converted into a potential by an electrostatic capacitance included in the floating diffusion FD. The amplification transistor 204 outputs a signal corresponding to the potential of the floating diffusion FD to the column signal line 110. The reset transistor 203 resets the potential of the floating diffusion FD to a predetermined potential. One row selection line 109 (V(j)) described above includes a transfer control line PTX(j), a reset control line PRES(j), and a row selection line PSEL(j) used to control the transfer transistor 202, the reset transistor 203, and the selection transistor 205, respectively. Note that a transfer control signal, a reset control signal, and a row selection signal respectively supplied to the transfer control line PTX(j), the reset control line PRES (j), and the row selection line PSEL(j) are also identified as PTX(j), PRES(j), and PSEL(j), respectively.

Figure 3:
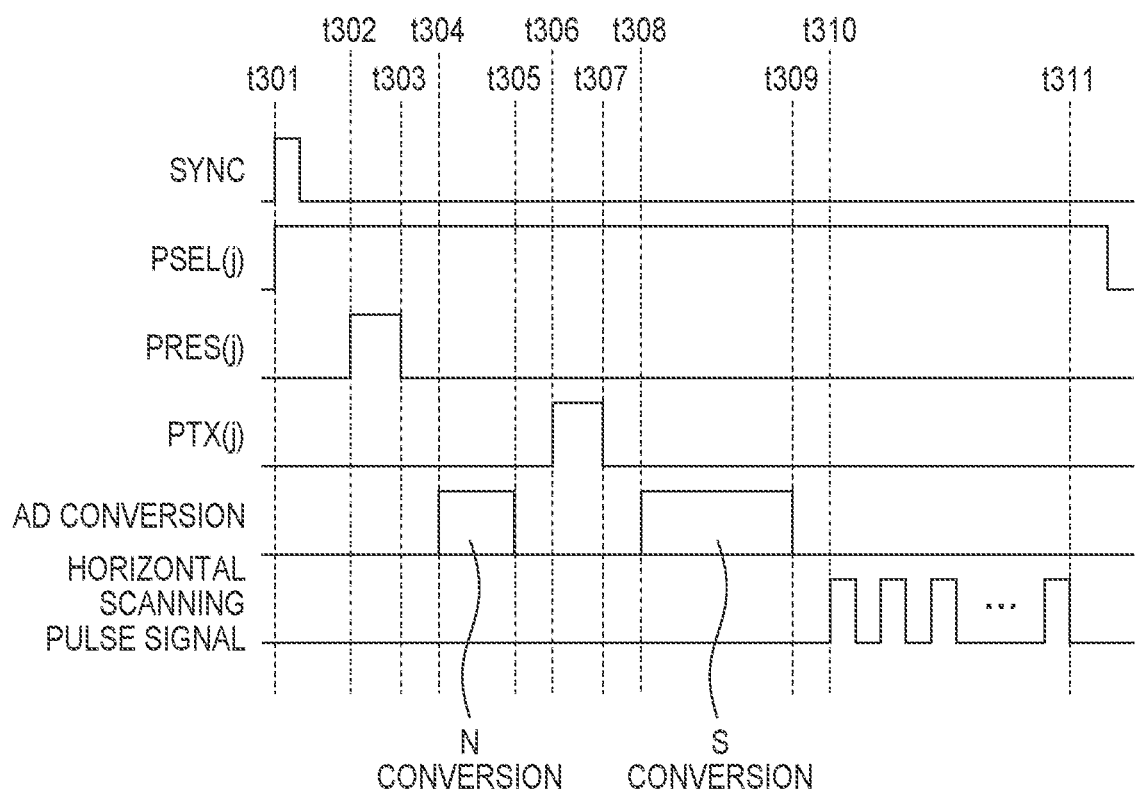
FIG. 3 is a view for explaining a basic readout operation of the photoelectric conversion apparatus according to the first embodiment.

Next, with reference to FIG. 3, a basic readout operation in the photoelectric conversion apparatus 100 will be described. FIG. 3 exemplarily shows a timing chart of the operation of reading out signals from the pixel array 101. Here, the operation of reading out signals from the pixel 102 in the jth row by the vertical scanning unit 103 is representatively shown. Note that signals shown in FIG. 3 are high-active signals.

At time t301, a horizontal synchronization signal SYNC is activated to high level, and the row selection signal PSEL(j) of the jth row is activated to high level. If the row selection signal PSEL(j) is set at high level, the selection transistor 205 of the pixel 102 in the selected row is set in the ON state, and the pixel 102 in the selected row is electrically connected to the column signal line 110.

At time t302, the reset control signal PRES(j) is activated to high level. This sets the reset transistor 203 of the pixel 102 in the ON state, and the floating diffusion FD is reset to the reset potential corresponding to a power supply potential VDD.

At time t303, the reset control signal PRES(j) is inactivated to low level, and the reset transistor 203 is set in the OFF state. Thus, the reset of the potential of the floating diffusion FD is released. Since the selection transistor 205 is kept in the ON state, a signal corresponding to the gate potential of the amplification transistor 204 at the time of release of the reset of the potential of the floating diffusion FD is output to the column signal line 110. In the period from time t303 to time t306, a noise level (N level) is output from the pixel 102 to the column signal line 110.

In the period from time t304 to time t305, the noise level output to the column signal line 110 can be read out as a digital signal by the readout circuit 105. The digital signal of the noise level read out by the readout circuit 105 is stored in the memory unit 106. The operation performed in the period from time t304 to time t305, that is, the operation of converting the noise level into the digital signal is referred to as N conversion.

At time t306, the transfer control signal PTX(j) is activated to high level. This sets the transfer transistor 202 of the pixel 102 in the ON state, and electric charges generated by photoelectric conversion in the photoelectric conversion element 201 are transferred to the floating diffusion FD. A signal corresponding to the electric charges generated in the photoelectric conversion element 201 is output to the column signal line 110. In the period from time t306 to time t310, an optical signal level (S level) is output from the pixel 102 to the column signal line 110.

At time t307, the transfer control signal PTX(j) is inactivated to low level. This sets the transfer transistor 202 in the OFF state. Even after the transfer transistor 202 is set in the OFF state, the optical signal level continues to be output to the column signal line 110.

In the period from time t308 to time t309, the optical signal level output to the column signal line 110 is read out as a digital signal by the readout circuit 105. The digital signal of the optical signal level read out by the readout circuit 105 is stored in the memory unit 106. The operation performed in the period from time t308 to time t309, that is, the operation of converting the optical signal level into the digital signal is referred to as S conversion.

In the period from time t310 to time t311, in accordance with a horizontal scanning pulse signal output from the horizontal scanning unit 107, a pair of the noise level and the optical signal level held in the memory unit 106 is output from the memory unit 106 to the signal processing unit 108. By repeating the horizontal scanning until the last column, readout of pairs of the noise levels and the optical signal levels of the pixels 102 for one row arranged in the readout target row is completed. The signal processing unit 108 includes a CDS circuit that performs a CDS process of generating a pixel signal by subtracting the noise level from the optical signal level. The CDS circuit outputs a pixel signal having undergone the CDS process.

Figure 4A:
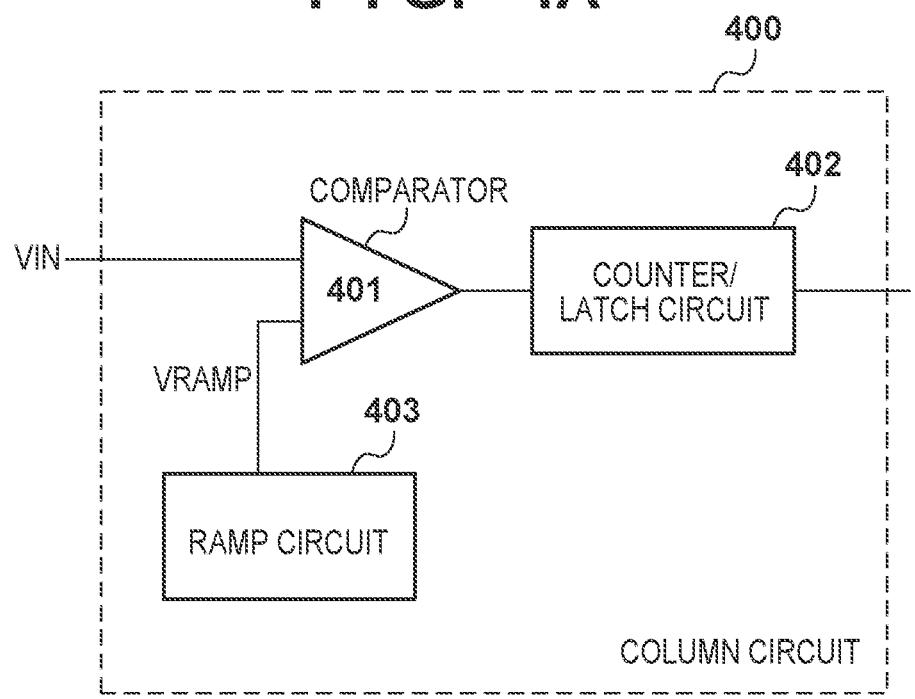
FIGS. 4A and 4B are views for explaining the arrangement and principle of A/D conversion.
Figure 4B:
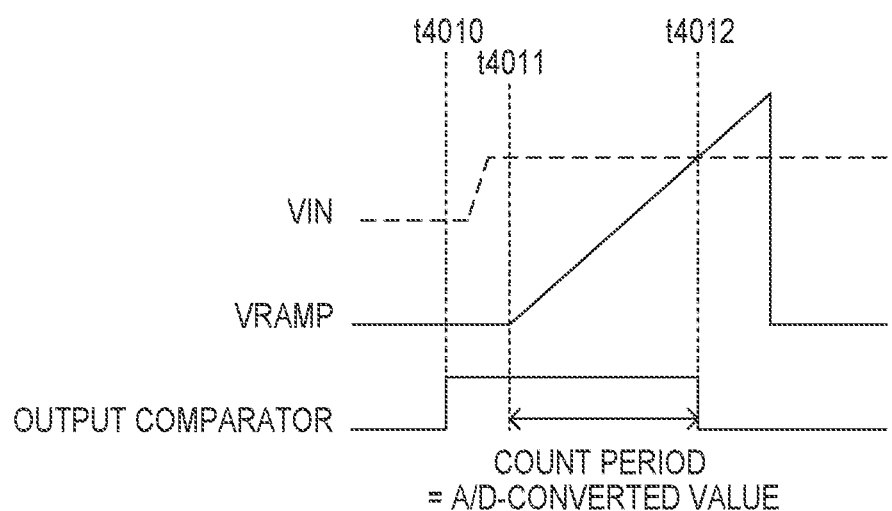

Next, with reference to FIGS. 4A and 4B, the arrangement and principle of A/D conversion performed by the readout circuit 105 will be exemplarily described. The readout circuit 105 includes, for each column, a column circuit 400 including an A/D converter, and the A/D converter can include a comparator 401, a counter/latch circuit 402, and a ramp circuit 403 as exemplarily shown in FIG. 4A. The ramp circuit 403 is a circuit that generates or outputs a reference signal VRAMP (ramp signal) which changes at a constant change rate (time change rate), that is, changes with a constant slope. The comparator 401 compares a signal VIN output from the pixel array 101 to the column signal line 110 with the reference signal VRAMP output from the ramp circuit 403, and outputs the comparison result.

As exemplarily shown in FIG. 4B, prior to the start of readout of the signal VIN output from the pixel array 101, the operation of the comparator 401 is started (time t4010). Once the signal VIN output from the pixel array 101 stabilizes, the count value of the counter/latch circuit 402 is reset at time t4011. In synchronization with the timing of reset of the count value of the counter/latch circuit 402, the level of the reference signal VRAMP output from the ramp circuit 403 increases along with the time elapse from time t4011. If the level of the reference signal VRAMP output from the ramp circuit 403 exceeds the optical signal level of the signal VIN output from the pixel array 101, the output of the comparator 401 is inverted (time t4012). The counter/latch circuit 402 performs a count operation in the period (time t4011 to time t4012) from the reset of the count value to the inversion of the output of the comparator 401. With this operation, the count value proportional to the level of the signal output from the pixel array 101 can be obtained, and the obtained count value serves as the result of A/D conversion. Note that the method of comparing the signal from the pixel array 101 with the reference signal, the comparison method by the counter/latch circuit, and the like described here are merely examples, and other methods may be used as long as the period from the reset of the count value to the inversion of the output of the comparator 401 can be detected.

Figure 5:
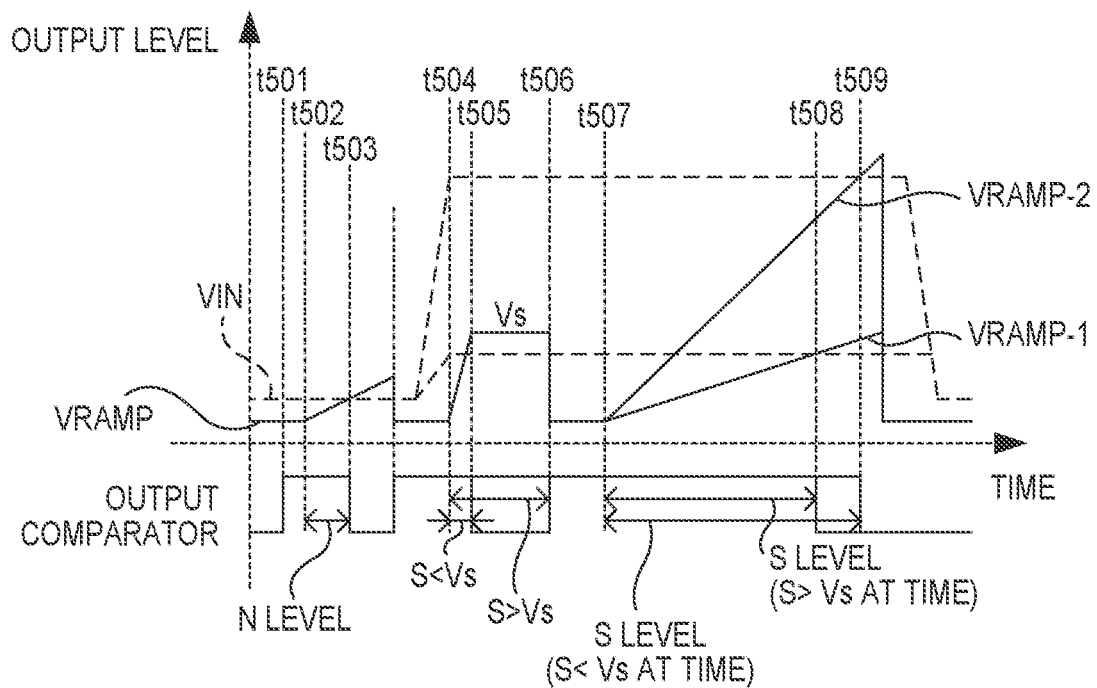
FIG. 5 is a view exemplarily showing the operation of a column circuit in the first embodiment.

FIG. 5 exemplarily shows the operation of one column circuit 400 in the readout circuit 105 according to the first embodiment. In FIG. 5, the abscissa exemplarily represents time, the ordinate in the upper stage exemplarily represents the level of the reference signal and the level of the signal from the pixel array 101, and the ordinates in the lower stage exemplarily represents the output of the comparator 401. Here, an example will be described in which the change rate (slope) of the reference signal VRAMP output from the ramp circuit 403 is changed in accordance with the level of the signal VIN output from the pixel array 101. The ramp circuit 403 can selectively generate or output a first reference signal VRAMP-1 which changes at a first change rate, a second reference signal VRAMP-2 which changes at a second change rate whose change rate (slope) is larger than the first range rate, and a determination reference signal.

First, in order to perform A/D conversion of the noise level (N level), the operation of the comparator 401 is started at time t501. The count of the counter/latch circuit 402 is reset at time t502, and the level of the reference signal VRAMP output from the ramp circuit 403 is changed at the first change rate. Since the noise level is small, the first reference signal VRAMP-1 (first ramp signal) having a small slope is used for A/D conversion of the noise level. The counter/latch circuit 402 performs the count operation in the period (time t502 to time t503) from the reset of the count to the inversion of the output of the comparator 401. With this, the noise level is A/D-converted.

Then, in the level determination period, the column circuit 400 determines the optical signal level which is the signal corresponding to electric charges accumulated in the photoelectric conversion element 201 in the pixel 102 in the pixel array 101. In the level determination period, the ramp circuit 403 outputs, to the comparator 401, the determination reference signal with a determination level Vs as the maximum level. The determination level Vs is a threshold value for determination. The comparator 401 compares the signal VIN output from the pixel array 101 with the determination reference signal. Here, the count value of the counter/latch circuit 402 is reset at time t504, and the ramp circuit 403 starts to output the determination reference signal. If the level of the signal VIN (optical signal level) output from the pixel array 101 is larger than the determination level Vs (S>Vs), the output of the comparator 401 is not inverted, so that the count value continues to increase until the level determination period ends at time t506. On the other hand, if the level of the signal VIN output from the pixel array 101 is smaller than the determination level Vs (S<Vs), for example, the output of the comparator 401 is inverted at time t505, so that the count value stops increasing. In this manner, based on the count value of the counter/latch circuit 402, the column circuit 400 can determine whether the optical signal level is larger or smaller than the determination level Vs.

The column circuit 400 supplies the result of determination as to whether the optical signal level is larger or smaller than the determination level Vs to the memory unit 106 as luminance determination information (luminance determination information LL to be described later). The luminance determination information is stored in the memory unit 106 while being associated with the digital signal generated by the column circuit 400. The luminance determination information can be, for example, information which has a value 1 (=high) if the optical signal level (S) is larger than the determination level Vs (S>Vs), and has a value 0 (=low) if the optical signal level is smaller than the determination level Vs (S<Vs). Note that it may be controlled such that the timing of resetting the count value of the counter/latch circuit 402 is the time at which the output of the ramp circuit 403 stabilizes at the determination level Vs, and the count value becomes 0 if the optical signal level (S) is smaller than the determination level Vs (S<Vs).

If the optical signal level (S) is smaller than the determination level Vs (S<Vs), from time t507, the optical signal level can be A/D-converted using the first reference signal VRAMP-1 as in A/D conversion of the noise level. With this, in the example shown in FIG. 5, the count value can be obtained in the period from time t507 to time t508. On the other hand, if the optical signal level (S) is larger than the determination level Vs, the optical signal level can be A/D-converted using the second reference signal VRAMP-2 which changes at the second change rate that is a times the first change rate of the first reference signal VRAMP-1. With this, in the example shown in FIG. 5, the count value can be obtained in the period from time t507 to time t509. Here, the first change rate of the first reference signal VRAMP-1 and the second change rate of the second reference signal VRAMP-2 can be understood as the gains of readout by the readout circuit 105, and correspond to the first gain and the second gain, respectively. That is, readout of the signal from the pixel array 101 using the first reference signal VRAMP-1 corresponds to readout of the signal from the pixel array 101 with the first gain. Further, readout of the signal from the pixel array 101 using the second reference signal VRAMP-2 corresponds to readout of the signal from the pixel array 101 with the second gain.

Figure 6:
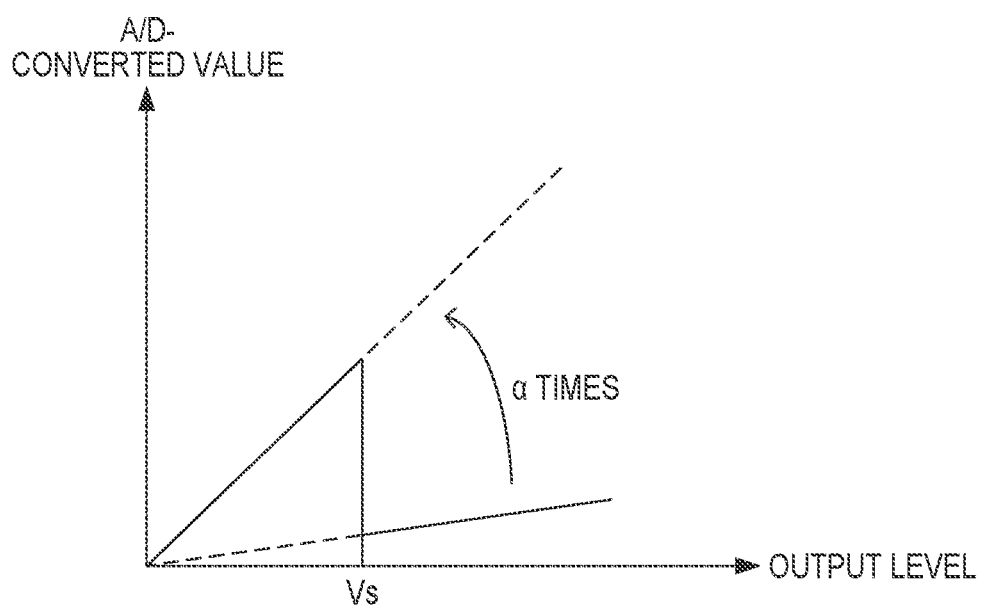
FIG. 6 is a view exemplarily showing the relationship between an optical signal level and the result of A/D conversion in a case in which the change rate (slope) of a reference signal is changed in accordance with the optical signal level.

FIG. 6 exemplarily shows the relationship between the optical signal level and the result of A/D conversion in a case in which the change rate (slope) of the reference signal is changed in accordance with the optical signal level. The abscissa of FIG. 6 represents the optical signal level output from the pixel array 101, and the ordinate represents the result (A/D-converted value) of A/D conversion of the optical signal level. The solid line indicates the digital value (A/D-converted value) having undergone A/D conversion by the comparator 401 and the counter/latch circuit 402 and supplied to the signal processing unit 108 via the horizontal scanning unit 107. As has been described above, the optical signal level having a value smaller than the determination level Vs is A/D-converted using the first reference signal VRAMP-1, and the optical signal level having a value larger than the determination level Vs is A/D-converted using the second reference signal VRAMP-2. Therefore, as shown in FIG. 6, the optical signal level after A/D conversion becomes discontinuous before and after the determination level Vs.

To solve this problem, the signal processing unit 108 multiplies the A/D-converted value of the optical signal level larger than the determination level Vs by a ratio α, which is the ratio (second change rate/first change rate) of the first change rate of the first reference signal VRAMP-1 and the second change rate of the second reference signal VRAMP-2.

Subsequently, the principle of the basic reset noise removal process performed in the signal processing unit 108 will be described. The A/D-converted optical signal level described with reference to FIG. 5 includes not only the signal component corresponding to the electric charges accumulated in the photoelectric conversion element 201 of the pixel 102 in the pixel array 101, but also the noise component such as reset noise due to the reset transistor 203. On the other hand, the A/D-converted noise level described with reference to FIG. 5 includes a noise component such as reset noise due to the reset transistor 203. Therefore, by performing the CDS process of subtracting the VD-converted noise level from the A/D-converted optical signal level, it is possible to reduce the reset noise from the optical signal level.

If the optical signal level is smaller than the determination level Vs, reset noise removal by the CDS process can be expressed as:

$$(SL+NL+DL)-(NL+DL)=SL \tag{1}$$

In equation (1), SL is the optical signal level having undergone A/D conversion using the first reference signal VRAMP-1, and NL is the noise level having undergone A/D conversion using the first reference signal VRAMP-1. Further, in equation (1), DL is a value obtained by converting, into an error component, the amount of response delay of the comparator 401 in a case of using the first reference signal VRAMP-1. The amount of response delay corresponds to the time from the timing at which the value of the signal output from the pixel array 101 exceeds the value of the first reference signal VRAMP-1 to the inversion of the output of the comparator 401 in response thereto. This amount of response delay appears as an error in the result of A/D conversion. If the optical signal level is smaller than the determination level Vs, both the optical signal level and the noise level are A/D-converted using the first reference signal VRAMP-1. Therefore, the influence of DL can be reduced by performing the process expressed by equation (1). Thus, the optical signal level SL corresponding only to the electric charges accumulated in the photoelectric conversion element 201 of the pixel 102 in the pixel array 101.

On the other hand, if the optical signal level is larger than the determination level Vs, reset noise removal by the CDS process can be expressed as:

$$\alpha \times (SH+NH+DH)-(NL+DL)=\alpha SH+\alpha DH-DL \tag{2}$$

In equation (2), SH is the optical signal level having undergone A/D conversion using the second reference signal VRAMP-2, and NH is the noise level having undergone A/D conversion using the second reference signal VRAMP-2. Further, in equation (2), DH is a value obtained by converting, into an error component, the amount of response delay of the comparator 401 in a case of using the second reference signal VRAMP-2. The amount of response delay corresponds to the time from the timing at which the value of the signal output from the pixel array 101 exceeds the value of the second reference signal VRAMP-2 to the inversion of the output of the comparator 401 in response thereto. This amount of response delay appears as an error in the result of A/D conversion. Since αNH and NL of the left-hand side of equation (2) indicate the same noise level, it can be regarded that NL=αNH. Accordingly, the left-hand side of equation (2) can be simplified as the right-hand side. Here, if the optical signal level is larger than the determination level Vs, the change rate of the reference signal used to A/D-convert the noise level is the first change rate, but the change rate of the reference signal used to A/D-convert the optical signal level is the second change rate. Thus, change rates different from each other are used. Hence, αDH−DL as the influence of the amount of response delay of the comparator 401 cannot be reduced by the CDS process. αDH−DL can be the offset error which varies among columns. Therefore, if αDH−DL is not removed or reduced, the influence of αDH−DL can appear as vertical stripes in an image output from the photoelectric conversion apparatus 100.

The first embodiment provides a function of removing or reducing the offset error in the photoelectric conversion apparatus 100 that includes the readout circuit 105 which reads out signals from the pixel array 101 with a gain selected from a plurality of gains. With reference to FIGS. 7 to 10, the arrangement and operation of the photoelectric conversion apparatus 100 according to the first embodiment of the second disclosure will be described below.

Figure 7:
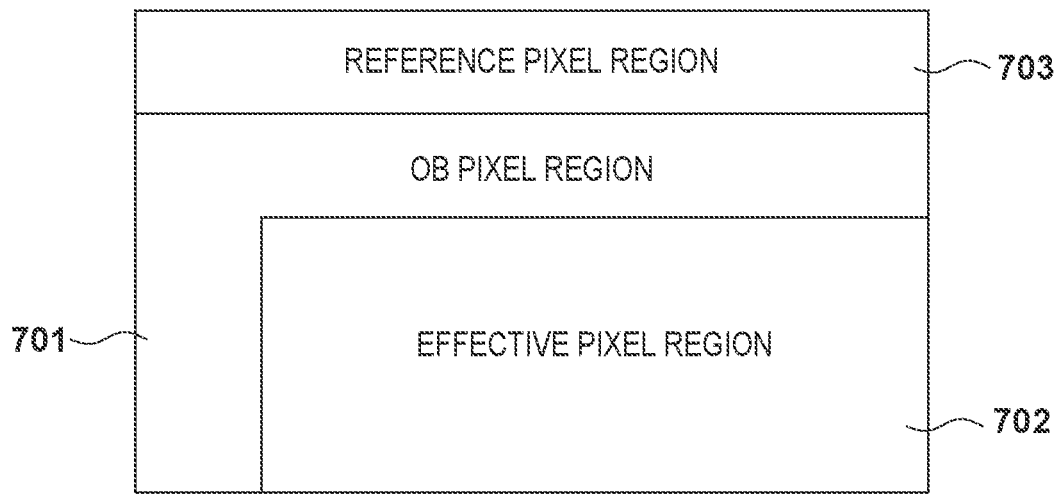
FIG. 7 is a view exemplarily showing the arrangement of a pixel array in the first embodiment.

FIG. 7 exemplarily shows the arrangement of the pixel array 101. The pixel array 101 includes an effective pixel region 702 for generating a pixel signal or an image signal by photoelectric conversion. The effective pixel region 702 is a region where a plurality of pixels (effective pixels) 102 are arranged so as to form a plurality of rows and a plurality of columns. The pixel array 101 can further include a reference pixel region 703. In the reference pixel region 703, a plurality of reference pixels, each of which outputs a noise level, can be arranged. The plurality of reference pixels can be arranged so as to include at least the reference pixels arranged in the columns corresponding to the plurality of columns in the effective pixel region 702. In other words, at least one reference pixel can be connected to each column signal line 110. The reference pixel can have an arrangement obtained by, for example, removing the photoelectric conversion element from the pixel 102. The reference pixel is shielded from light by a light shielding film. The reference pixel can be used to generate a correction value used to remove or reduce the above-described offset error. The pixel array 101 can further include an Optical Black (OB) pixel region 701. A plurality of OB pixels, each of which outputs an OB level, are arranged in the OB pixel region 701. The OB pixel can be, for example, a pixel having the same arrangement as the pixel 102 but covered with a light shielding film.

The photoelectric conversion apparatus 100 according to the first embodiment has a calibration mode for generating a correction value, and an image capturing mode for generating an image by photoelectric conversion. The control unit 104 can generate a control signal for operating the photoelectric conversion apparatus 100 in the calibration mode, and a control signal for operating the photoelectric conversion apparatus 100 in the image capturing mode. In the calibration mode, a correction value can be generated by reading out a signal from the reference pixel in the reference pixel region 703 by the readout circuit 105, and processing the signal by the signal processing unit 108.

Figure 8:
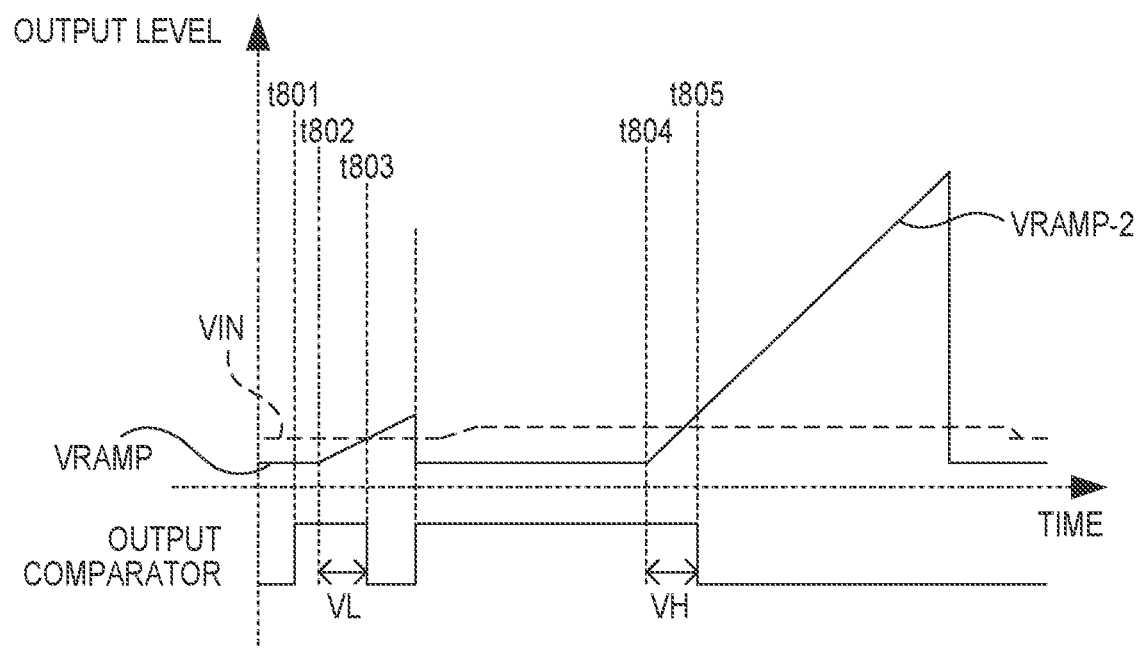
FIG. 8 is a view exemplarily showing an operation of reading out a signal from a reference pixel region in a calibration operation according to the first embodiment.

FIG. 8 exemplarily shows an operation of reading out a signal from the reference pixel in the calibration mode. First, an operation of A/D-converting a predetermined voltage (here, a predetermined voltage VL for the sake of descriptive convenience) by the column circuit 400 of the readout circuit 105 is performed. More specifically, the operation of the comparator 401 is started at time t801. At time t802, the count of the counter/latch circuit 402 is reset, and the first reference signal VRAMP-1, which changes at the first change rate, is supplied from the ramp circuit 403 to the comparator 401. By performing a count operation in the period (time t802 to time t803) from the reset of the count of the counter/latch circuit 402 to the inversion of the output of the comparator 401, the predetermined voltage VL is A/D-converted.

Then, a predetermined voltage (here, a predetermined voltage VH for the sake of descriptive convenience) is A/D-converted. More specifically, at time t804, the count of the counter/latch circuit 402 is reset, and the second reference signal VRAMP-2 is supplied from the ramp circuit 403 to the comparator 401. By performing the count operation in the period (time t804 to time t805) from the reset of the count of the counter/latch circuit 402 to the inversion of the output of the comparator 401, the predetermined voltage VH is A/D-converted. As has been described above, the second reference signal VRAMP-2 is a ramp signal which changes at the second change rate that is a times the first change rate of the first reference signal VRAMP-1.

Figure 9:
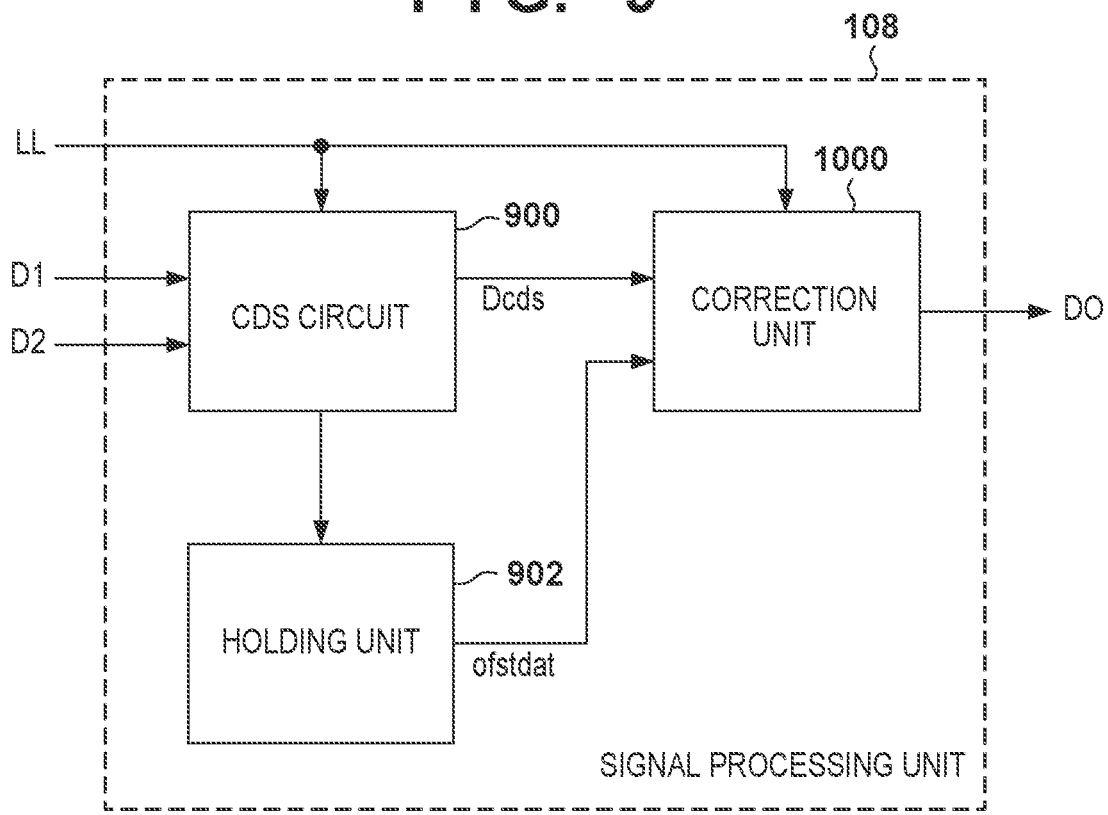
FIG. 9 is a view exemplarily showing the arrangement of a signal processing unit in the first embodiment.

FIG. 9 exemplarily shows the arrangement of the signal processing unit 108. The signal processing unit 108 can include a CDS circuit 900 that performs a CDS process on a pair of digital signals provided from the pixel array 101 (effective pixel, reference pixel, or OB pixel) via the column signal line 110, the readout circuit 105, and the memory unit 106. Here, in the image capturing mode, when reading out signals from the effective pixel, the pair of digital signals supplied to the CDS circuit 900 is composed of the digital signal of the noise level and the digital signal of the optical signal level. In the image capturing mode, when reading out signals from the OB pixel, the pair of digital signals supplied to the CDS circuit 900 is composed of the digital signal of the reset level and the digital signal of the dark level which is read out while setting the transfer transistor 202 in the ON state.

In the calibration mode, signals are read out from the reference pixel. When reading out signals from the reference pixel, the pair of digital signals supplied to the CDS circuit 900 is composed of a first digital signal D1 read out with the first gain, and a second digital signal D2 read out with the second gain. The first gain corresponds to the first reference signal VRAMP-1, and the second gain corresponds to the second reference signal VRAMP-2. Here, the CDS circuit 900 multiplies the second digital signal D2 read out with the second gain (second reference signal VRAMP-2) by a based on the luminance determination information LL. The first digital signal D1 can be expressed as NL+DL. The second digital signal D2 multiplied by a can be expressed as α×(SH@NULL+NH+DH). Accordingly, an output of the CDS circuit 900 can be expressed as equation (3). The first digital signal D1, that is, NL+DL is a signal read out from the pixel array 101 with the first gain by the readout circuit 105 in a state in which the noise level is output from the pixel array 101. The second digital signal D2, that is, α×(SH@NULL+NH+DH) is a signal read out from the pixel array 101 with the second gain by the readout circuit 105 in a state in which the noise level is output from the pixel array 101. An output of the CDS circuit 900 is the difference between the first digital signal D1 and the second digital signal D2.

$$\alpha \times (SH@NULL+NH+DH)-(NL+DL)=\alpha DH-DL \qquad (3)$$

SH@NULL is a signal obtained by reading out a signal of the reference pixel arranged in the reference pixel region 703 by A/D conversion using the second reference signal VRAMP-2. Since the reference pixel does not include the photoelectric conversion element 201, SH@NULL is substantially 0. In addition, as has been described above, it can be regarded that NL=αNH. Accordingly, the left-hand side of equation (3) can be simplified as the right-hand side. The right-hand side of equation (3) corresponds to the offset error αDH−DL to be removed in the right-hand side of equation (2). That is, the signal (the difference between the first digital signal D1 and the second digital signal D2) output from the CDS circuit 900 in the calibration mode corresponds to the offset error to be removed. Thus, this can be used as the correction value. The signal processing unit 108 may include a holding unit 902 that holds the correction value. The holding unit 902 can hold the signal output from the CDS circuit 900 for each column, that is, the correction value in association with the column. Here, multiple pairs of digital signals may be acquired by reading out signals multiple times from the reference pixels in each column, and the average value of multiple provisional correction values obtained by supplying the multiple pairs of digital signals to the CDS circuit 900 may be used as the correction value.

The pixel 102 (effective pixel) may be used to generate the correction value. In this case, the signal is read out from the pixel 102 while inactivating the transfer control signal PTX for the selected pixel 102. Alternatively, the OB pixel may be used to generate the correction value. Alternatively, the correction value may be generated by setting the potential of the column signal line 110 to an arbitrary fixed potential. That is, an arbitrary means can be taken as long as αDH−DL can be obtained.

The plurality of column circuits 400 of the readout circuit 105 may be provided such that one column circuit 400 is assigned to one column signal line 110, or may be provided such that one column circuit 400 is assigned to at least two column signal lines. In the latter case, in the calibration mode, the correction value may be decided for each column signal line 110, or the correction value may be decided for each column circuit 400.

Figure 10:
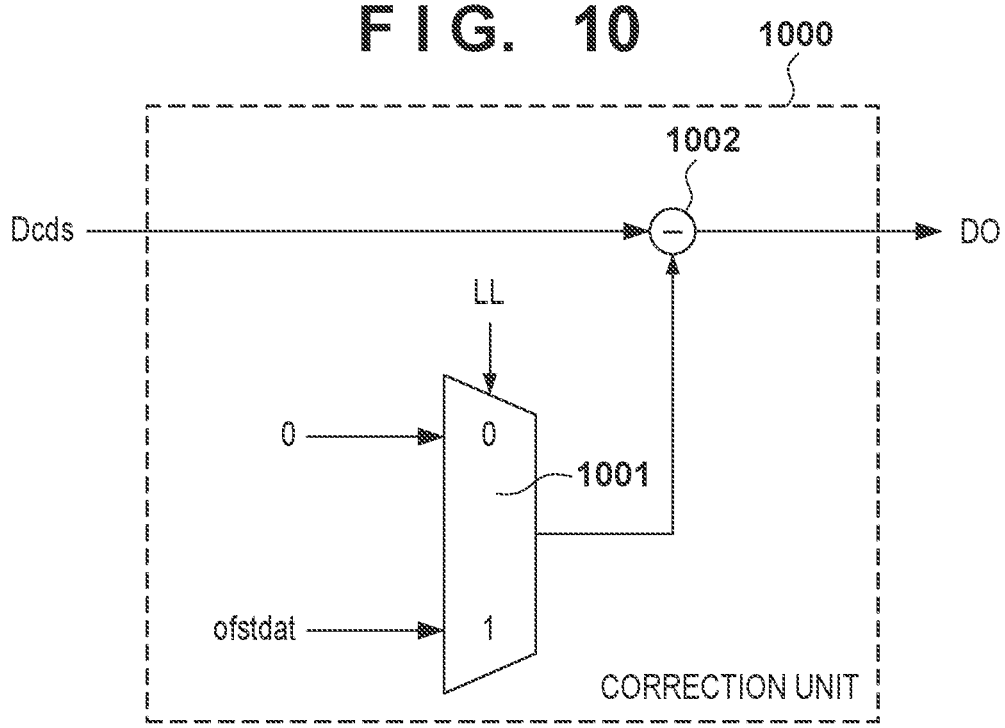
FIG. 10 is a view exemplarily showing the arrangement of a correction unit.

The signal processing unit 108 can include a correction unit 1000 that corrects, using the correction value provided from the holding unit 902, the signal (corresponding to the right-hand side of equation (2)) output from the CDS circuit 900 in the image capturing mode. FIG. 10 exemplarily shows the arrangement of the correction unit 1000. The correction unit 1000 can include a selection unit 1001 and a subtractor 1002. In the image capturing mode, the CDS circuit 900 is sequentially provided with the pair of digital signals read out from the effective pixel or OB pixel via the column signal line 110 by the readout circuit 105 and stored in the memory unit 106, and the luminance determination information LL. The CDS circuit 900 supplies, to the correction unit 1000, a signal (corresponding to the right-hand side of equation (2)) Dcds obtained by performing the CDS process on the pair of digital signals, and the signal Dcds is supplied to the subtractor 1002. The holding unit 902 supplies, to the selection unit 1001, a correction value ofstdat (corresponding to the right-hand side of equation (3)) corresponding to the pair of digital signals among a plurality of correction values stored in the holding unit 902. If the luminance determination information LL corresponding to the pair of digital signals is 1, the selection unit 1001 can supply, to the subtractor 1002, the correction value ofstdat supplied from the holding unit 902. If the luminance determination information LL is 0, the selection unit 1001 can supply 0 as the correction value to the subtractor 1002. The correction unit 1000 performs calculation of subtracting the correction value ofstdat (corresponding to the right-hand side of equation (3)) from the signal (corresponding to the right-hand side of equation (2)) Dcds supplied from the CDS circuit 900, and outputs the result as a pixel signal DO. This calculation can be expressed as:

$$\alpha SH+\alpha DH-DL-(\alpha DH-DL)=\alpha SH \qquad (4)$$

Accordingly, even in a case in which the optical signal level is A/D-converted using the second reference signal VRAMP-2 by the readout circuit 105 (that is, a case in which the optical signal level is read out with the second gain by the readout circuit 105), it is possible to remove or reduce the offset error.

The offset error can change depending on temperature. Therefore, it is preferable to execute the calibration mode at an arbitrary timing or a timing planned in advance. Alternatively, the correction value may be generated in each frame (vertical scanning period), and the signal Dcds may be corrected based on the correction value in the same frame (vertical scanning period).

In the example described above, the offset error is corrected only if the luminance determination information LL is 1. However, even if the luminance determination information LL is 0, that is, even if the optical signal level is A/D-converted using the first reference signal VRAMP-1, the offset error may be corrected. In this case, instead of acquiring the digital signal using the second reference signal VRAMP-2 as shown in FIG. 8, the digital signal is acquired using the first reference signal VRAMP-1, and the correction value may be decided using the acquired digital signal. This arrangement is advantageous in reducing the influence of the offset error caused by the variation in the power supply potential among the column circuits.

Figure 11:
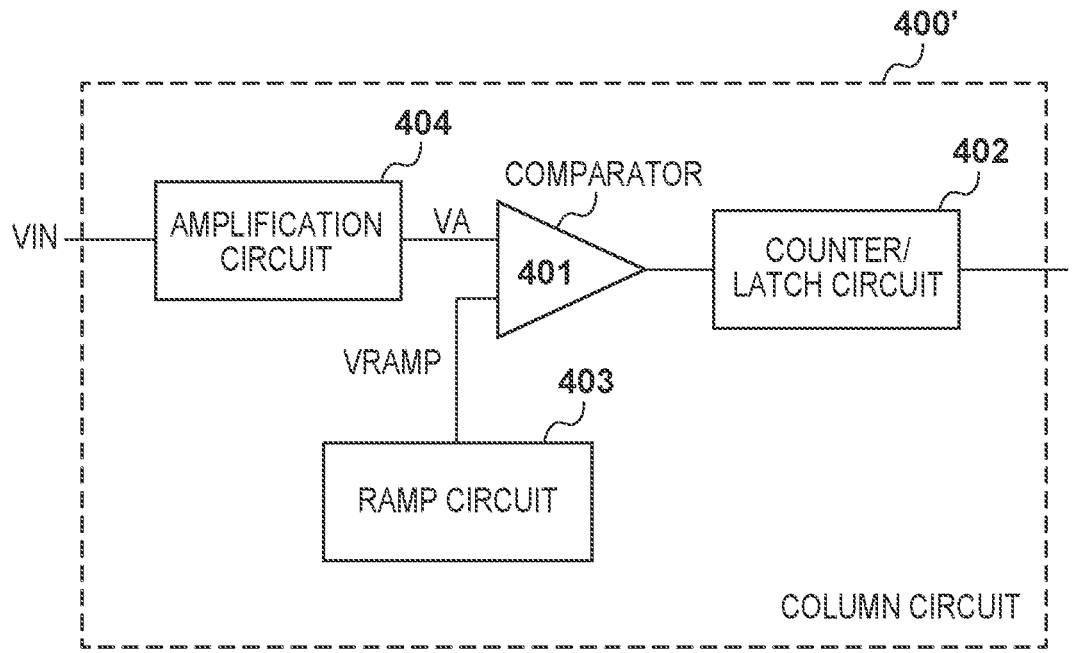
FIG. 11 is a view exemplarily showing the arrangement of a column circuit in the second embodiment.
Figure 12:
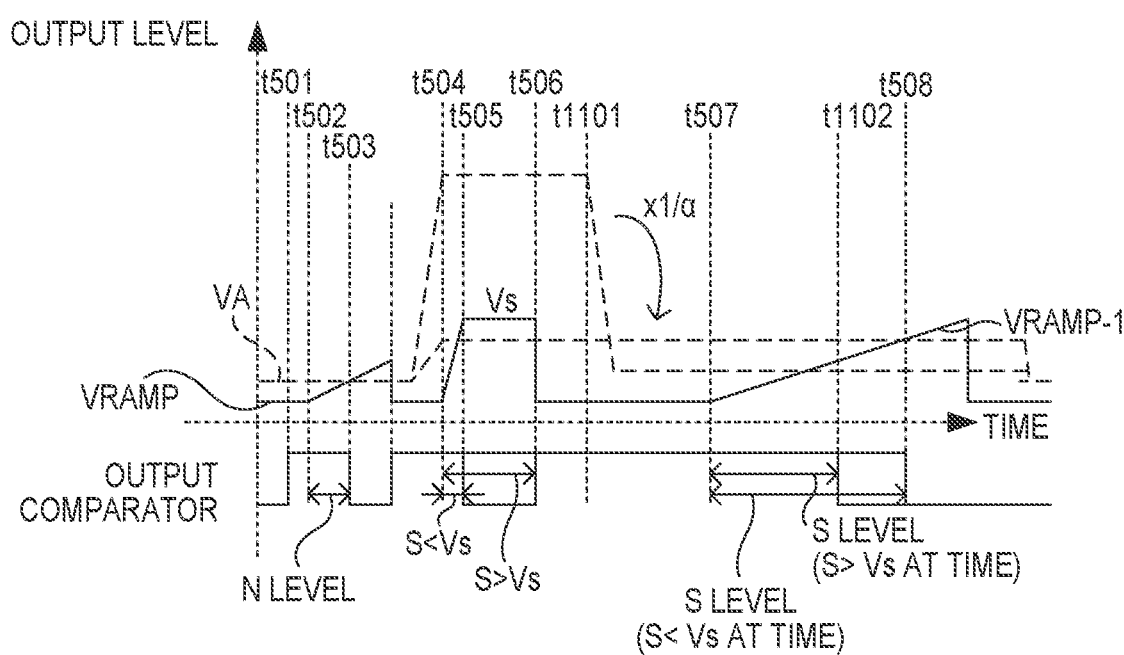
FIG. 12 is a view exemplarily showing the operation of a column circuit in the second embodiment.
Figure 13:
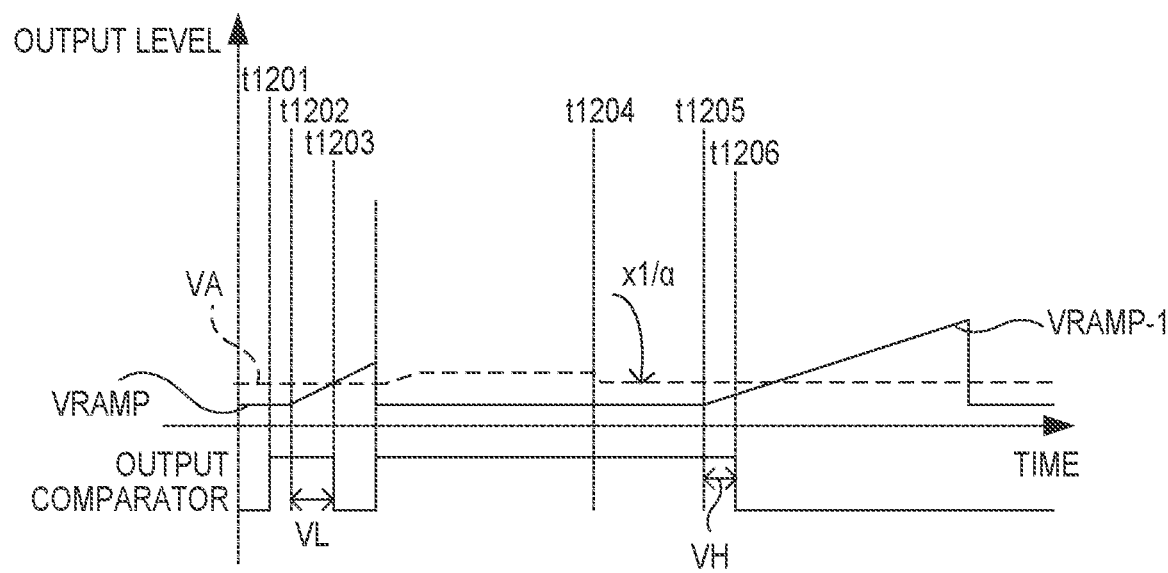
FIG. 13 is a view exemplarily showing an operation of reading out a signal from a reference pixel region in a calibration operation according to the second embodiment.

With reference to FIGS. 11 to 13 a photoelectric conversion apparatus 100 according to the second embodiment of the second disclosure will be described below. Matters not mentioned as the second embodiment of the second disclosure can follow the first embodiment of the second disclosure. FIG. 11 shows an arrangement example of one column circuit 400' of a plurality of column circuits 400' of a readout circuit 105 in the photoelectric conversion apparatus 100 according to the second embodiment of the second disclosure. In the second embodiment of the second disclosure, the column circuit 400 in the first embodiment of the second disclosure is replaced with the column circuit 400'. The column circuit 400' includes an amplification circuit 404 that amplifies a signal VIN supplied from a pixel array 101 via a column signal line 110, and an output VA of the amplification circuit 404 is supplied to a comparator 401. This arrangement is advantageous in expanding the dynamic range and improving the S/N ratio.

FIG. 12 exemplarily shows the operation of one column circuit 400' in the readout circuit 105 according to the second embodiment. In FIG. 12, the abscissa exemplarily represents time, the ordinate in the upper stage exemplarily represents the level of the reference signal and the level of the signal from the pixel array, and the ordinate in the lower stage exemplarily represents the output of the comparator 401. With reference to FIG. 12, an example of changing the gain of the amplification circuit 404 in accordance with the level of the signal VIN from the pixel array 101 will be described. The readout operation of the noise level and the determination operation of the optical signal level are similar to the operations in the period from time t501 to time t506 in FIG. 5, so that a description thereof will be omitted. Note that in the period from time t501 to time t506, the gain of the amplification circuit 404 is set at the first gain.

If the optical signal level is smaller than the determination level Vs (S<Vs), A/D conversion is performed while setting the gain of the amplification circuit 404 at the first gain. That is, similar to the noise level readout period, A/D conversion of the optical signal level is performed from time t507 while suppling a first reference signal VRAMP-1 to the comparator 401 by a ramp circuit 403. With this, in the example shown in FIG. 12, a count value can be obtained in the period from time t507 to time t508. On the other hand, if the optical signal level is larger than the determination level Vs (S>Vs), the gain of the amplification circuit 404 is changed from the first gain to the second gain (1/α times the first gain) at time t1101. Thereafter, A/D conversion of the optical signal level can be performed using the first reference signal VRAMP-1. With this, in the example shown in FIG. 12, a count value can be obtained in the period from time t507 to time t1102. Thus, it is possible to implement expansion of the dynamic range and improvement of the S/N ratio.

Subsequently, the principle of the reset noise removal process performed in a signal processing unit 108 of the second embodiment will be described. The optical signal level read out by A/D conversion described with reference to FIG. 12 includes not only the signal component corresponding to the electric charges accumulated in a photoelectric conversion element 201 of a pixel 102 in the pixel array 101, but also a noise component such as reset noise due to a reset transistor 203. On the other hand, the A/D-converted noise level described with reference to FIG. 12 includes a noise component such as reset noise due to the reset transistor 203. Therefore, by performing the CDS process of subtracting the A/D-converted noise level from the A/D-converted optical signal level, it is possible to reduce the reset noise from the optical signal level.

If the optical signal level is smaller than the determination level Vs, reset noise removal by the CDS process can be expressed as equation (1) described above.

On the other hand, if the optical signal level is larger than the determination level Vs, reset noise removal by the CDS process can be performed according to the method expressed by:

$$\alpha \times \{(SH+NH+AOH)-(NL+AOL)\} = \alpha SH + \alpha AOH - \alpha AOL \quad (5)$$

In equation (5), as has been described above, it can be regarded that NL=NH. In equation (5), AOH is the offset component of the amplification circuit 404 obtained when the amplification circuit 404 amplifies the signal VIN with the second gain in the period of reading out the optical signal level. Further, in equation (5), AOL is the offset component of the amplification circuit 404 obtained when the amplification circuit 404 amplifies the signal VIN with the first gain in the period of reading out the noise level. Since the gain of the amplification circuit 404 changes between readout of the optical signal level and readout of the noise level, this can generate the difference between AOH and AOL. Accordingly, αAOH−αAOL cannot be reduced by the CDS process. αAOH−αAOL can be the offset error which varies among columns. Therefore, in a case in which αAOH−αAOL cannot be removed or reduced, the influence of αAOH−αAOL can appear as vertical stripes in an image output from the photoelectric conversion apparatus 100.

In the arrangement in which the amplification circuit 404 amplifies the signal from the pixel array 101 with the gain selected from a plurality of gains, the second embodiment provides a function of removing or reducing the offset error that can be generated when the optical signal level and the noise level are amplified with different gains.

Similar to the photoelectric conversion apparatus 100 according to the first embodiment of the second disclosure, the photoelectric conversion apparatus 100 according to the second embodiment of the second disclosure has a calibration mode for generating a correction value, and an image capturing mode for generating an image by photoelectric conversion. A control unit 104 generates a control signal for operating the photoelectric conversion apparatus 100 in the calibration mode, and a control signal for operating the photoelectric conversion apparatus 100 in the image capturing mode. In the calibration mode, a correction value can be generated by reading out a signal from the reference pixel in a reference pixel region 7703 by the readout circuit 105, and processing the signal by the signal processing unit 108.

FIG. 13 exemplarily shows an operation of reading out a signal from the reference pixel in the calibration mode. First, an operation of amplifying and A/D-converting a predetermined voltage (here, a predetermined voltage VL for the sake of descriptive convenience) by the column circuit 400' of the readout circuit 105 is performed. More specifically, the operation of the comparator 4401 is started at time t1201. At time t1202, the count of a counter/latch circuit 4402 is reset, and the first reference signal VRAMP-1, which changes at the first change rate, is supplied from the ramp circuit 4403 to the comparator 4401. The amplification circuit 4404 outputs the voltage obtained by amplifying the predetermined voltage VL with the first gain, and the A/D conversion unit (401, 402, and 403) A/D-converts the amplified voltage. By performing a count operation in the period (time t1202 to time t1203) from the reset of the count of the counter/latch circuit 4402 to the inversion of the output of the comparator 401, the amplification operation and A/D conversion of the predetermined voltage VL are performed.

Then, the amplification operation and A/D conversion of a predetermined voltage (here, a predetermined voltage VH for the sake of descriptive convenience) are performed. Here, after the predetermined voltage VH is amplified with the second gain, which is 1/α times the first gain, by the amplification circuit 404 (time t1204), the amplified voltage is A/D-converted. By performing the count operation in the period from time t1205 to time t1206, the amplification operation and A/D conversion of the predetermined voltage VH are performed.

A first digital signal D1 obtained by reading out the predetermined voltage VL as described above and a second digital signal D2 obtained by reading out the predetermined voltage VH are supplied to a CDS circuit 900 of the signal processing unit 108 exemplarily shown in FIG. 9. In the CDS circuit 900, a correction value used to correct the offset error is generated by the CDS process, and stored in a holding unit 902. The first digital signal D1 can be expressed as α×(NL+AOL). The second digital signal D2 multiplied by a can be expressed as α×(SH@NULL+NH+AOH). Accordingly, an output of the CDS circuit 900 can be expressed as:

$$\alpha \times \{(SH@NULL+NH+AOH)-(NL+AOL)\} = \alpha AOH - \alpha AOL \quad (6)$$

Here, SH@NULL is a signal obtained by reading out a signal of the reference pixel arranged in the reference pixel region 703 with the second gain and the first reference signal VRAMP-1. Since the reference pixel does not include the photoelectric conversion element 201, SH@NULL is substantially 0. In addition, as has been described above, it can be regarded that NL=NH. Accordingly, the left-hand side of equation (6) can be simplified as the right-hand side. The right-hand side of equation (6) corresponds to the offset error αAOH−αAOL to be removed in the right-hand side of equation (5). That is, the signal output from the CDS circuit 9900 in the calibration mode corresponds to the offset error to be removed. Thus, this can be used as the correction value.

A correction unit 1000 of the signal processing unit 108 corrects, using the correction value provided from a holding unit 902, the signal (corresponding to the right-hand side of equation (5)) output from the CDS circuit 900 in the image capturing mode. The correction unit 1000 can include a selection unit 1001 and a subtractor 1002. In the image capturing mode, the CDS circuit 900 is sequentially provided with the pair of digital signals read out from the effective pixel or OB pixel via the column signal line 110 by the readout circuit 105 and stored in a memory unit 106, and luminance determination information LL. The CDS circuit 900 supplies, to the correction unit 1000, a signal (corresponding to the right-hand side of equation (5)) Dcds obtained by performing the CDS process on the pair of digital signals, and the signal Dcds is supplied to the subtractor 1002. The holding unit 902 supplies, to the selection unit 1001, a correction value ofstdat (corresponding to the right-hand side of equation (6)) corresponding to the pair of digital signals among a plurality of correction values stored in the holding unit 902. If the luminance determination information LL corresponding to the pair of digital signals is 1, the selection unit 1001 can supply, to the subtractor 1002, the correction value ofstdat supplied from the holding unit 902. If the luminance determination information LL is 0, the selection unit 1001 can supply 0 as the correction value to the subtractor 1002. The correction unit 1000 performs calculation of subtracting the correction value ofstdat (corresponding to the right-hand side of equation (6)) from the signal (corresponding to the right-hand side of equation (5)) Dcds supplied from the CDS circuit 900. This calculation can be expressed as:

$$\alpha SH + \alpha AOH - \alpha AOL - (\alpha AOH - \alpha AOL) = \alpha SH \quad (7)$$

Accordingly, even in a case in which the optical signal level is amplified with the second gain by the readout circuit 105 (that is, a case in which the optical signal level is read out with the second gain by the readout circuit 105), it is possible to remove or reduce the offset error.

Note that in the second embodiment of the second disclosure, the column circuit 400' includes the A/D converter. However, the column circuit 400' may output the signal output from the amplification circuit 404 without performing A/D conversion.

Figure 14:
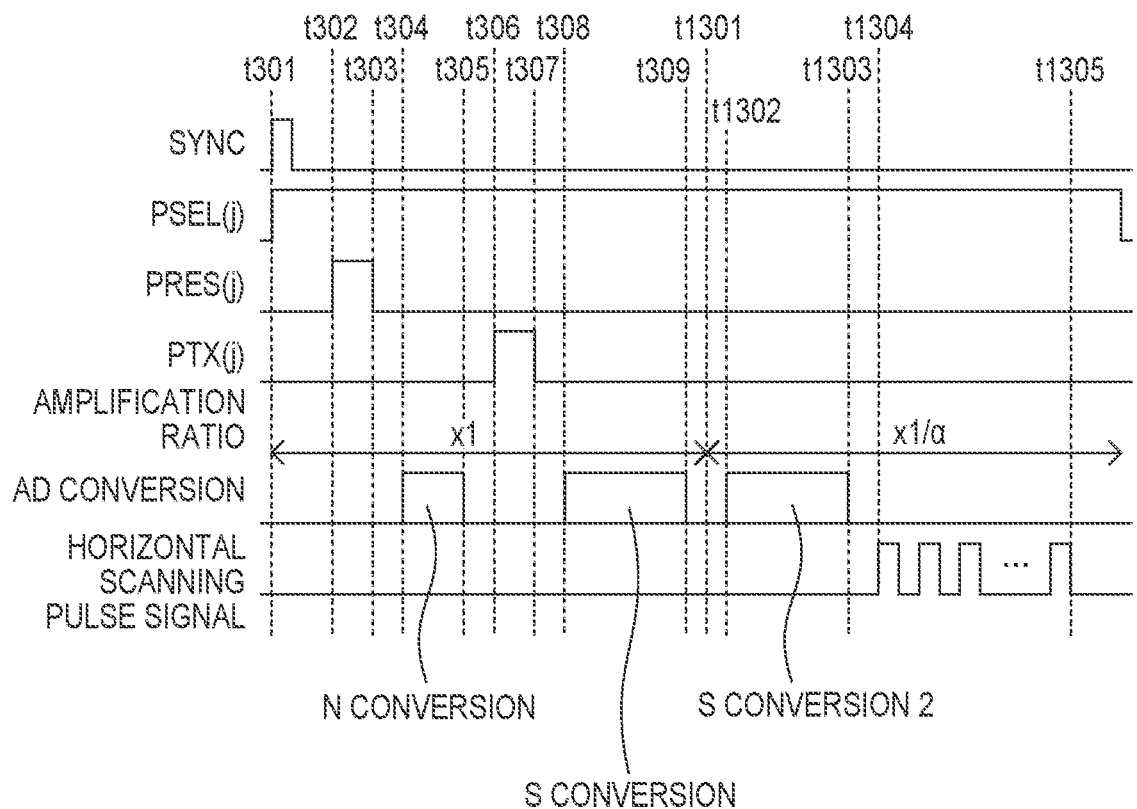
FIG. 14 is a view exemplarily showing the operation of a photoelectric conversion apparatus according to the third embodiment.

With reference to FIG. 14, a photoelectric conversion apparatus 100 according to the third embodiment will be described below. The photoelectric conversion apparatus 100 according to the third embodiment of the second disclosure can have an arrangement similar to that of the photoelectric conversion apparatus 100 according to the second embodiment of the second disclosure. Matters not mentioned as the third embodiment of the second disclosure can follow the first and second embodiments of the second disclosure. In the third embodiment of the second disclosure, in order to expand the dynamic range, optical signal levels are read out while time-sequentially switching the gain of an amplification circuit 404.

FIG. 14 exemplarily shows the operation of one column circuit 400' in a readout circuit 105 in the third embodiment. Here, the operation of reading out signals from a pixel 102 in the jth row by a vertical scanning unit 103 is representatively shown. Note that each signal shown in FIG. 14 is a high-active signal. The operation of reading out the noise level and the optical signal level with the same gain is common to the operation in the period from time t301 to time t309 in FIG. 3. In FIG. 14, in the period from time t301 to time t309, the gain of the amplification circuit 404 is set at the first gain, and this is exemplarily shown as "×1"

At time t1301, the gain of the amplification circuit 404 is changed from the first gain (for example, ×1) to the second gain (for example, ×1/α) different from the first gain. Here, in order to change the gain of the amplification circuit 404, the feedback capacitance in the amplification circuit is changed. However, another configuration may also be used.

In the period from time t1302 to time t1303, the optical signal level output to a column signal line 110 is multiplied by 1/α by the amplification circuit 404, and then converted into a digital signal by the A/D conversion unit (401, 402, and 403). This operation is referred to as S conversion 2. In this manner, N conversion, S conversion, and S conversion 2 are performed, and each result is stored in a memory unit 106. Here, let N be the digital signal obtained by N conversion, S be the digital signal obtained by S conversion, and S2 be the digital signal obtained by S conversion 2.

In the period from time t1304 to time t1305, signals of the pixels 102 (the signal of each pixel is composed of N, S, and S2) for one row stored in the memory unit 106 can be sequentially selected by a horizontal scanning unit 107, and supplied to a signal processing unit 108. By performing the horizontal scanning until the last column, readout of signals (N, S, S2) of the pixels 102 for one row arranged in the readout target row is completed. The signal processing unit 108 includes a CDS circuit 900 that performs a CDS process of generating a pixel signal by subtracting the noise level from the optical signal level. The CDS circuit 900 outputs a pixel signal Dcds having undergone the CDS process.

The CDS circuit 900 of the signal processing unit 108 reduces the fixed pattern noise by performing a process of subtracting N from S and a process of subtracting N from S2. The dynamic range can be expanded using the signal obtained by subtracting N from S and the signal obtained by subtracting N from S2. However, since S2 and N are signals read out with gains different from each other, even if the process of subtracting N from S2 is performed, an offset error can remain. This offset error can appear as vertical stripes in an image output from the photoelectric conversion apparatus 100.

The correction value for correcting the offset error is acquired by executing a calibration mode as in the second embodiment, and stored in a holding unit 902. In an image capturing mode, the signal obtained by subtracting N from S2 by the CDS circuit 900 can be corrected based on the correction value.

Figure 15:
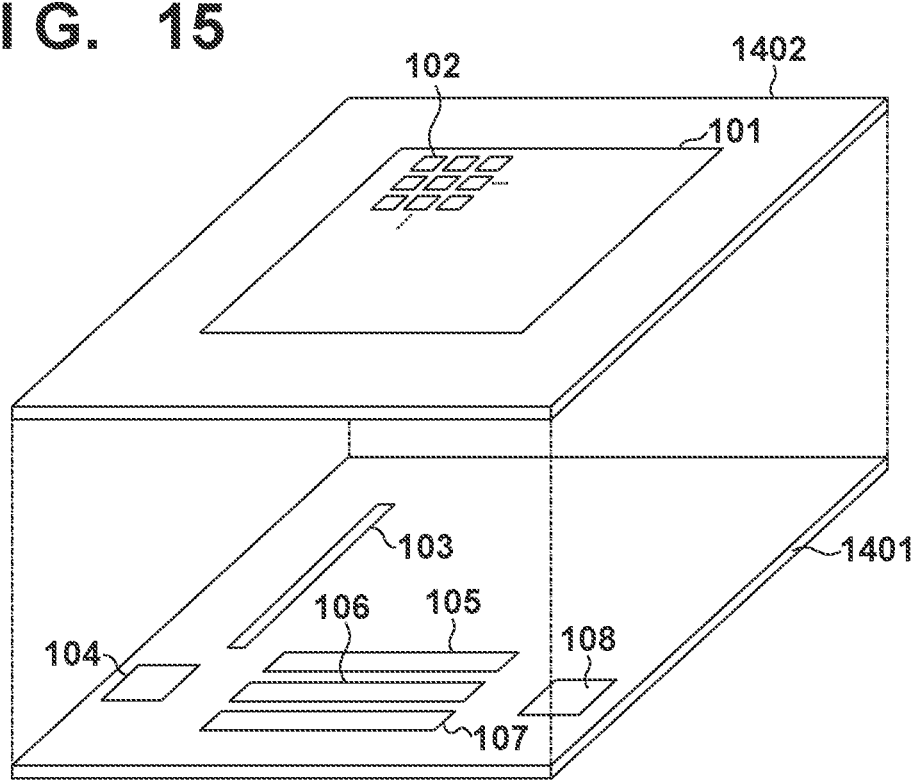
FIG. 15 is a view exemplarily showing the structure of the photoelectric conversion apparatus.

FIG. 15 shows an example of the structure of the photoelectric conversion apparatus 100 exemplarily described through the first to third embodiments. The photoelectric conversion apparatus 100 may include a first substrate 1401 and a second substrate 1402. Each of the first substrate 1401 and the second substrate 1402 can be formed by processing, for example, a semiconductor substrate such as a silicon substrate. On the first substrate 1401, for example, the signal processing unit 108, the vertical scanning unit 103, a control unit 104, the readout circuit 105, the memory unit 106, the horizontal scanning unit 107, and the like can be arranged.

On the second substrate 1402, for example, a pixel array 101 including an OB pixel region 701, an effective pixel region 702, and a reference pixel region 703 can be arranged. As exemplarily shown in FIG. 15, at least a part of the first substrate 1401 and at least a part of the second substrate 1402 can be stacked. With the arrangement as described above, when manufacturing the photoelectric conversion apparatus 100, it is possible to apply a process suitable for each of an analog portion including the pixel array 101 and a logic portion including the signal processing unit 108.

Note that in the embodiments described above, the arrangement has been mainly described in which the readout circuit 105 included in the photoelectric conversion apparatus 100 generates a digital signal by A/D conversion, but the present invention is not limited to this example. The readout circuit 105 may output an analog signal intact to the subsequent circuit. For example, the readout circuit 105 may output an analog signal intact to the signal processing unit 108, and the signal processing unit 108 may VD-convert the analog signal. Alternatively, the signal processing unit 108 may not perform A/D conversion, and the photoelectric conversion apparatus 100 may output the analog signal intact to an external A/D conversion unit. Even with such a form, the correction process described in each embodiment described above can be preferably executed.

Figure 16:
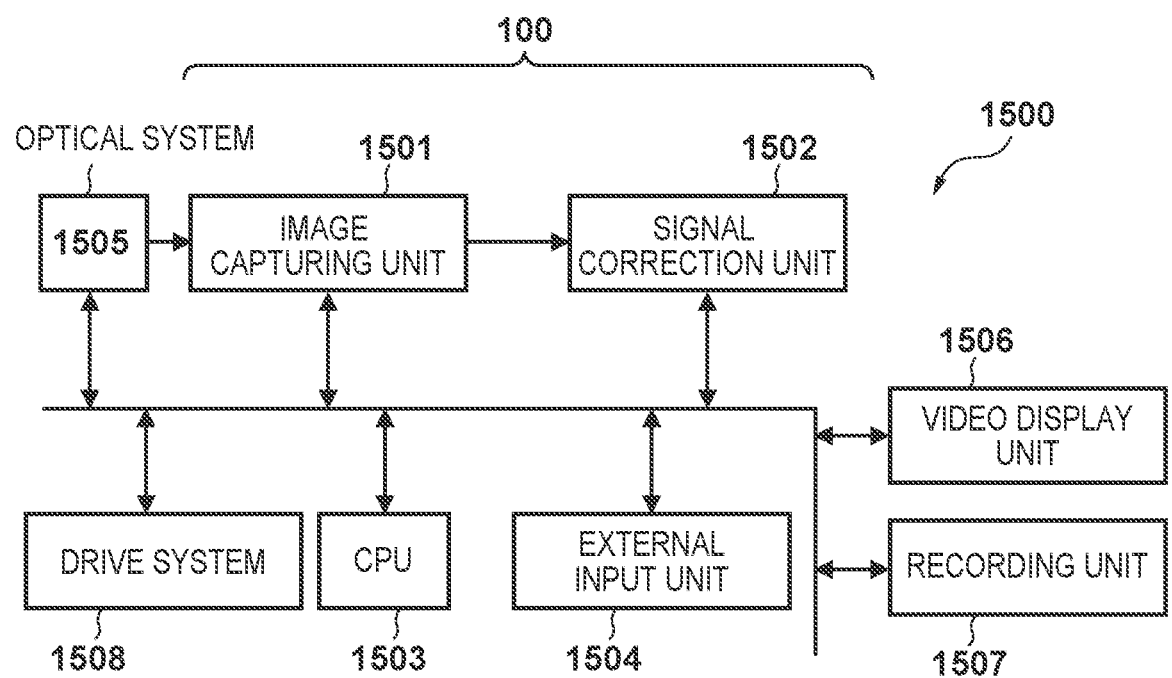
FIG. 16 is a view exemplarily showing the arrangement of an image capturing apparatus.

FIG. 16 exemplarily shows the arrangement of an image capturing apparatus 1500 incorporating the photoelectric conversion apparatus 100. The image capturing apparatus 1500 can include an image capturing unit 1501, a signal correction unit 1502, a CPU 1503, an external input unit 1504, an optical system 1505, a video display unit 1506, a recording unit 1507, and a drive system 1508. In an example, the image capturing unit 1501 is a functional block which includes the pixel array 101, the vertical scanning unit 103, the control unit 104, the readout circuit 105, the memory unit 106, and the horizontal scanning unit 107. Such the image capturing unit 1501 may be understood as a photoelectric conversion apparatus. Alternatively, the image capturing unit 1501 may be the photoelectric conversion apparatus 100 including the signal processing unit 108 described above. In an example, the signal correction unit 1502 can include the signal processing unit 108 described above.

In the pixel array 101 of the image capturing unit 1501, an optical image is formed by the optical system 1505. The image capturing unit 1501 outputs an image signal corresponding to the optical image by photoelectric conversion. The signal correction unit 1502 corrects the image signal output from the image capturing unit 1501, and outputs the corrected image signal to the video display unit 1506 and/or the recording unit 1507. The CPU 1503 controls the respective components in the image capturing unit 1500. The drive system 1508 can, for example, drive the focusing lens of the optical system 1505 and drive the aperture. The external input unit 1504 can include various kinds of buttons and the like used by a user to input an image capturing condition and perform a shutter operation. The video display unit 1506 may be a touch panel. In this case, the video display unit 1506 can function as the external input unit 1504 (a part thereof).

The present invention can also be implemented by executing the following process. That is, software (program) for implementing the above-described functions may be supplied to the system or apparatus via a network or various kinds of storage media. One or more processors (for example, a CPU and an MPU) in the computer of the system or apparatus can read out and execute the software (program). Alternatively, the above-described function can also be implemented by a circuit (for example, ASIC) having a fixed function, or a function definable circuit (for example, FPGA).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140206, filed Sep. 2, 2022, which is hereby incorporated by reference herein in its entirety.

What is claimed is:

1. A photoelectric conversion apparatus comprising
a pixel array including an effective pixel,
a readout circuit configured to read out a signal of the pixel array, and
a signal processing unit configured to perform a correlated double sampling process and a correction process on signals read out from the effective pixel in the pixel array by the readout circuit, wherein
the readout circuit has a function of reading out a signal of the pixel array with a first gain, and a function of reading out a signal of the pixel array with a second gain different from the first gain, and
a correction value for the correction process is generated based on a difference between a signal read out from the pixel array with the first gain by the readout circuit in a state in which a noise level is output from the pixel array, and a signal read out from the pixel array with the second gain by the readout circuit in a state in which a noise level is output from the pixel array.

2. The photoelectric conversion apparatus according to claim 1, wherein
the readout circuit includes a plurality of column circuits, and each column circuit reads out the signal of the pixel array via at least one of a plurality of column signal lines of the pixel array, and
the signal processing unit corrects a signal, which has been read out via a column signal line from the pixel array by each column circuit, based on a correction value, of a plurality of correction values, corresponding to the column signal line.

3. The photoelectric conversion apparatus according to claim 2, wherein
the correction value is an average value of a plurality of provisional correction values, and each of the plurality of provisional correction values is generated based on a signal read out from the pixel array with the first gain by the readout circuit in a state in which a noise level is output from the pixel array, and a signal read out from the pixel array with the second gain by the readout circuit in a state in which a noise level is output from the pixel array.

4. The photoelectric conversion apparatus according to claim 1, wherein
the readout circuit reads out a noise level from the effective pixel in a first period, and reads out an optical signal level from the effective pixel in a second period, and
the signal processing unit corrects, based on the correction value, a signal obtained from the optical signal level read out from the effective pixel in the second period and the noise level read out from the effective pixel in the first period.

5. The photoelectric conversion apparatus according to claim 1, wherein
the pixel array includes a reference pixel configured to output a noise level, and
the correction value is generated based on a signal read out from the reference pixel with the first gain by the readout circuit and a signal read out from the reference pixel with the second gain by the readout circuit.

6. The photoelectric conversion apparatus according to claim 1, wherein
the readout circuit includes an A/D converter, and
the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

7. The photoelectric conversion apparatus according to claim 6, wherein
the signal processing unit decides the correction value based on a signal obtained by multiplying, by a ratio corresponding to the first gain and the second gain, a signal read out from the pixel array with the second gain by the readout circuit in a state in which a noise level is output from the pixel array, and a signal read out from the pixel array with the first gain by the readout circuit in a state in which a noise level is output from the pixel array.

8. The photoelectric conversion apparatus according to claim 1, wherein
the readout circuit includes an amplification circuit configured to amplify a signal output from the pixel array, and an A/D converter configured to A/D-convert a signal output from the amplification circuit, and
a gain of the amplification circuit used when reading out a signal of the pixel array with the first gain and a gain of the amplification circuit used when reading out a signal of the pixel array with the second gain are different from each other.

9. The photoelectric conversion apparatus according to claim 7, wherein
the signal processing unit decides the correction value based on a signal obtained by multiplying, by a ratio corresponding to the first gain and the second gain, a difference between a signal read out from the pixel array with the second gain by the readout circuit in a state in which a noise level is output from the pixel array and a signal read out from the pixel array with the first gain by the readout circuit in a state in which a noise level is output from the pixel array.

10. The photoelectric conversion apparatus according to claim 1, wherein
the readout circuit decides, in accordance with a level of a signal supplied from the effective pixel, which one of the first gain and the second gain is to be used to read out a signal of the effective pixel.

11. A photoelectric conversion system comprising
a photoelectric conversion apparatus defined in claim 1, and
a signal processing unit configured to generate an image using a signal output from the photoelectric conversion apparatus.

12. A photoelectric conversion system that comprises a photoelectric conversion apparatus and a signal processing unit, characterized in that
the photoelectric conversion apparatus comprises a pixel array including an effective pixel, and a readout circuit configured to read out a signal of the pixel array,
the readout circuit has a function of reading out a signal of the pixel array with a first gain, and a function of reading out a signal of the pixel array with a second gain different from the first gain,
the signal processing unit is configured to perform a correlated double sampling process and a correction process on signals read out from the effective pixel in the pixel array by the readout circuit, and
a correction value for the correction process is generated based on a signal read out from the pixel array with the first gain by the readout circuit in a state in which a noise level is output from the pixel array, and a signal read out from the pixel array with the second gain by the readout circuit in a state in which a noise level is output from the pixel array.

13. A photoelectric conversion method comprising
reading out a noise level of an effective pixel in a pixel array with a first gain,
reading out, with a second gain different from the first gain, an optical signal level corresponding to electric charges generated by photoelectric conversion in the effective pixel, and
performing a correlated double sampling process and a correction process on the noise level and the optical signal level,
wherein a correction value for the correction process is generated based on a difference between a signal read out from the pixel array with the first gain in a state in which a noise level is output from the pixel array and a signal read out from the pixel array with the second gain in a state in which a noise level is output from the pixel array.

14. The photoelectric conversion method according to claim 13, further comprising
generating the correction value.

* * * * *